United States Patent
Golan et al.

(10) Patent No.: US 8,896,697 B2
(45) Date of Patent: Nov. 25, 2014

(54) VIDEO MOTION COMPENSATION AND STABILIZATION GIMBALED IMAGING SYSTEM

(76) Inventors: Chen Golan, Ein Vered (IL); Boris Kipnis, Tel-Aviv (IL)

( * ) Notice: Subject to any disclaimer, the term of this patent is extended or adjusted under 35 U.S.C. 154(b) by 586 days.

(21) Appl. No.: 13/259,250

(22) PCT Filed: Apr. 6, 2010

(86) PCT No.: PCT/IL2010/000280
§ 371 (c)(1),
(2), (4) Date: Sep. 23, 2011

(87) PCT Pub. No.: WO2010/116366
PCT Pub. Date: Oct. 14, 2010

(65) Prior Publication Data
US 2012/0019660 A1    Jan. 26, 2012

Related U.S. Application Data

(60) Provisional application No. 61/167,226, filed on Apr. 7, 2009.

(51) Int. Cl.
*H04N 7/18*    (2006.01)
*H04N 5/232*    (2006.01)
*H04N 5/262*    (2006.01)

(52) U.S. Cl.
CPC ....... *H04N 5/23258* (2013.01); *H04N 5/23248* (2013.01); *H04N 5/232* (2013.01); *H04N 5/23264* (2013.01); *H04N 5/2628* (2013.01)
USPC ......................................................... 348/144

(58) Field of Classification Search
CPC .......... H04N 5/23248; H04N 5/23258; H04N 5/232; H04N 5/23264; H04N 5/2628; G02B 27/646; G01C 11/025
USPC ............................................... 348/144, 208.4
See application file for complete search history.

(56) References Cited

U.S. PATENT DOCUMENTS

2008/0151064 A1*   6/2008   Saito et al. ................. 348/208.4

* cited by examiner

*Primary Examiner* — Allen Wong

(57) ABSTRACT

A system and method for compensating for image distortions formed by the motion of a computerized camera system mounted on a moving platform. The camera system includes a camera, wherein the camera acquires a plurality of image frames including images of the environment viewed from within the field of view of the camera. The distortion is formed in the acquired image frame, during and in between image acquisitions. During the image acquisition the camera may be maneuvered in space, typically, in the pan and tilt axis. The method includes the steps of providing camera maneuvering signals, providing sensors for detecting other motions of the camera, computing the pre acquisition aggregated motion vector of the camera, thereby determining the pre acquisition image distortion, and compensating for the determined pre acquisition image distortion by an equivalent vector, in a direction opposite to the direction of the pre acquisition aggregated motion vector.

46 Claims, 5 Drawing Sheets

VIDEO MOTION COMPENSATION AND STABILIZATION GIMBALED IMAGING SYSTEM

RELATED APPLICATION

The present application claims the benefit of U.S. provisional application 61/167,226 filed on Apr. 7, 2009, the disclosure of which is incorporated herein by reference.

FIELD OF THE INVENTION

The present invention relates to imaging systems, and more particularly, the present invention relates to an imaging system, operatively mounted on an air-born vehicle, that can transmit high resolution images of a selected region of interest, whereas the images are continuously compensated for vehicle motion.

BACKGROUND OF THE INVENTION AND PRIOR ART

An image sensor is generally subject to motion and vibrations which might distort a detected image of a scene. The motion can be linear, where the image sensor undergoes a linear displacement or scaling, and the motion can be angular, where the image sensor rotates about one or more axes. In case of an image sensor mounted on a marine vessel, the image can be distorted as a result of ocean waves. Likewise, image distortion can occur in images detected by an image sensor mounted to a ground vehicle, an airborne platform, such as an aircraft, a helicopter or a satellite.

Methods for compensating for the vibrations and noise in order to obtain a stabilized image are known in the art. For example, a gyroscope connected to the image sensor detects the inertial rotations of the image sensor, and a servo system (including a servo motor and a controller) rotates the gimbals on which the image sensor is mounted, in the opposite direction and by the same amount, according to the output of the gyroscope. The image can be further refined by employing additional gyroscopes and by providing each gyroscope additional degrees of freedom.

Prior art imaging systems are typically large in size and thereby in relative weight. Furthermore, prior art imaging systems require extensive image processing on the whole image frame acquired, particularly for high resolution imaging systems.

There is a need for and it would be advantageous to have image sensors, mounted on an airborne vehicle, such as unmanned aerial vehicle (UAV), having high resolution and capability to select in real the region-of-interest (ROI), low cost, low weight and low power consumption.

SUMMARY OF THE INVENTION

The present invention describes a motion-compensation and stabilization gimbaled camera system for performing image acquisition and image transmission. The present invention is often described herein in terms of an air-born camera system, but the present invention is not limited to an air-born motion compensation and stabilization gimbaled camera system, and the system can be used in any video acquisition system, such as on hand held cameras, land-vehicle mounted, traffic control systems, waterways-vehicle mounted, etc.

According to teachings of the present invention, there is provided a camera system including camera motion compensation and stabilization units, using a high resolution image sensor, such as a multi-megapixel CMOS ("CMOS image sensor") or a camera module with digital pan, tilt and optionally zoom capability, mounted on a moving platform and having a simple mechanical gimbals support. The camera system facilitates, each time before an image is captured, to compensate for unwanted image motion or jitter caused by the camera platform motion, by pointing to relevant image array region corresponding to a selected geographical region of interest, just before capturing the image. The correct window offset is calculated using platform angular motion sensors, such as gyro or rate-gyro.

According to further teachings of the present invention, there is provided a method for compensating for image distortions formed by the motion of a computerized camera system mounted on a moving platform. The camera system includes a camera having one or more image sensor arrays, wherein the camera acquires consecutively, in real time, a plurality of image frames including images of the environment viewed from within the field of view of the camera. The distortion is formed in the acquired image frame, during and in between image acquisitions. During the image acquisition the camera may be maneuvered in space, typically, in the pan and tilt axis. The platform can be an air born vehicle, a land vehicle, a waterway vehicle, a living body, carried by hand or any other moving and/or vibrating platform.

The method for compensating for image distortions in the acquired image frames includes the steps of providing camera maneuvering signals, providing one or more sensors for detecting the motion of the camera, computing the pre acquisition aggregated motion vector of the camera, thereby determining the pre acquisition image distortion caused by the pre acquisition aggregated motion vector of the camera, compensating for the determined pre acquisition image distortion by a magnitude equal to the magnitude of the pre acquisition aggregated motion vector, in a direction opposite to the direction of the pre acquisition aggregated motion vector, and acquiring an image frame.

The camera maneuvering signals are maneuvering commands as provided by the steering control of the camera.

The one or more sensors are typically displacement sensors for sensing changes in spatial position such as angular rate sensors, gyroscope sensors, rate gyroscope sensors or smart inertial navigation system units.

Preferably, the method further includes the steps of providing an environmental region of interest within the environment viewed from within the field of view of the camera, and determining the array of pixels being a portion of the one or more image sensor arrays acquiring the image of the environmental region of interest and thereby obtaining an image region of interest. The compensation for the determined pre acquisition image distortion is performed on the image region of interest.

Optionally, the method for compensating for image distortions in the acquired image frames includes steps for further compensating for distortions not attended by the pre acquisition compensation steps. The method further includes post acquisition compensation steps of determining the post acquisition image distortion caused by the detected motion of the camera from the instant of issuing of a command for acquiring an image frame until the actual acquisition of the image frame, and compensating for the determined post acquisition image distortion, wherein the compensation for the determined post acquisition image distortion is applied to the image region of interest, whereby creating a final image region of interest. The compensation for the determined post acquisition image distortion is performed by a magnitude equal to the magnitude of the post acquisition aggregated motion vector and in a direction opposite to the direction of the post acquisition aggregated motion vector.

Preferably, the method further includes the steps of padding the image region of interest with a predefined margin, before determining the post acquisition image distortion, and cropping the image region of interest to remove the margin, after compensating for the determined post acquisition image distortion, and before forming the final image region of interest.

Optionally, when using a camera having a rolling shutter, the method further includes the steps of determining the rolling shutter image distortion, typically a wobble distortion, and compensating for the determined rolling shutter image distortion in an opposite direction to the direction of the rolling shutter image distortion for each line or pixel in the image region of interest. It should be noted that determining the rolling shutter image distortion and the compensation for the determined rolling shutter image distortion are performed in either line, pixel or sub-pixel resolution.

In embodiments of the present invention, the compensation for the determined rolling shutter image distortion are performed in the X-axis by line shifts to the opposite direction of the rolling shutter motion during the image acquisition scan.

In embodiments of the present invention, the compensation for the determined rolling shutter image distortion is performed in the Y-axis by calculating and changing the line to line distances.

Optionally, the method further includes the steps of providing a zooming mechanism, providing a zoom request including zoom parameters, and computing the final image region with the provided parameters of the zoom request. The zooming mechanism can be an optical zoom, an electronic zoom or a combination of optical zoom and electronic zoom.

It should be noted that the resolution of the acquired image frame may be larger than the resolution of the image region of interest and the final image region of interest. It should be noted that the original resolution of the acquired image frame may be extended using digital zooming methods.

Optionally, the method for compensating for image distortions in the acquired image frames includes steps for further compensating for distortions not attended by the pre acquisition compensation steps and the post acquisition compensation steps. The method further includes the steps of providing a digital image stabilization unit, determining residual image distortions, and compensating for the residual image distortions. The step of determining of residual image distortions includes computing the correlation between a previously computed final image region of interest and the currently computed final image region of interest.

Preferably, after completion of the post acquisition compensation steps the final image region of interest is transmitted to a predetermined video receiving unit, typically a remote video receiving unit.

The camera system my further include a motorized mechanical gimbal that extends the camera dynamic range with an additional degree of freedom. The motorized mechanical gimbal can be operated by a variety of motors, including a step motor, a DC motor, a brushless motor, etc., and is preferable operated by a DC motor with pulse width modulation, to control motor force and speed.

In variations of the present invention, in a computerized gimbaled camera system, the method further includes the step of activating the motorized mechanical gimbal to maintain the central pixel of the image region of interest, representing the center of the environmental region of interest, within a distance less than a predefined threshold value from the center of the image sensor array.

In variations of the present invention, in a computerized gimbaled camera system, the method further includes the steps of computing the distance of each edge of the image region of interest from the respective edge of the image sensor array, and activating the motorized mechanical gimbal to maintain each of the edges of the image region of interest at a distance less than a predefined threshold value from the respective edge of the image sensor array. Optionally, the computation of the distance of each of the edges of the image region of interest, from the respective edge of the image sensor array, uses a hysteresis function. The hysteresis values of the hysteresis function may be calculated as a function of zoom and motion changes prediction.

An aspect of the present invention is to provide a computerized camera system mounted on a moving platform, optionally having a steering control, for compensating for image distortions in the acquired image frames, wherein the distortions are caused by movements and/or vibrations of the camera.

The computerized camera system includes a camera having one or more image sensor arrays, wherein the camera acquires consecutively, in real time, a plurality of image frames including images of the environment viewed from within a field of view of the camera, the camera system including a coordinate offset calculation unit, a camera steering control, a displacement sensor, an image sensor configuration control unit, and a video timing unit.

The video timing unit determines the frame acquisition rate of the camera and wherein the video timing unit begins a frame acquisition cycle having a pre acquisition portion and a post acquisition portion. The camera steering control provides tilt and/or pan motional data of the camera. The displacement sensor senses the camera motion in space. The coordinate offset calculation unit continuously aggregates the sensed motions of the camera and thereby determining a pre acquisition aggregated motion vector. The image sensor configuration control unit determines the pre acquisition image distortion caused by the pre acquisition aggregated motion vector. The image sensor configuration control unit compensates for the determined pre acquisition image distortion by a magnitude equal to the magnitude of the pre acquisition aggregated motion vector, in a direction opposite to the direction of the pre acquisition aggregated motion vector.

In preferred embodiments of the present invention, the camera system further includes a computation unit and a post-capturing image processing unit. The coordinate offset calculation unit and the image sensor configuration control unit provide the computation unit with timing on motion data. The computation unit continuously aggregates the sensed motions of the camera from the instant of issuing of a command for acquiring an image frame until the actual acquisition of the image frame and thereby determining a post acquisition aggregated motion vector. The post-capturing image processing unit determines the post acquisition image distortion caused by the post acquisition aggregated motion vector. The post-capturing image processing unit compensates for the determined post acquisition image distortion by a magnitude equal to the magnitude of the post acquisition aggregated motion vector, in a direction opposite to the direction of the post acquisition aggregated motion vector.

In variations of the present invention, the camera systems further includes a mechanism for adjusting the zoom of the camera, In variations of the present invention, the camera systems further includes a motorized gimbaled device, wherein the motorized gimbaled device extends the camera dynamic range by providing an additional degree of freedom; and wherein the motorized gimbaled device facilitates maintaining an environmental region of interest within the field of view of the camera.

In variations of the present invention, the camera systems further includes a digital image stabilization unit, wherein the digital image stabilization unit performs final digital image stabilization and small jitter correction.

Preferably, the camera system further includes a transmitter for transmitting the final region of interest to a video receiving unit, typically a remote video receiving unit.

BRIEF DESCRIPTION OF THE DRAWINGS

The present invention will become fully understood from the detailed description given herein below and the accompanying drawings, which are given by way of illustration and example only and thus not limitative of the present invention, and wherein.

DESCRIPTION OF THE PREFERRED EMBODIMENTS

Figure 1:
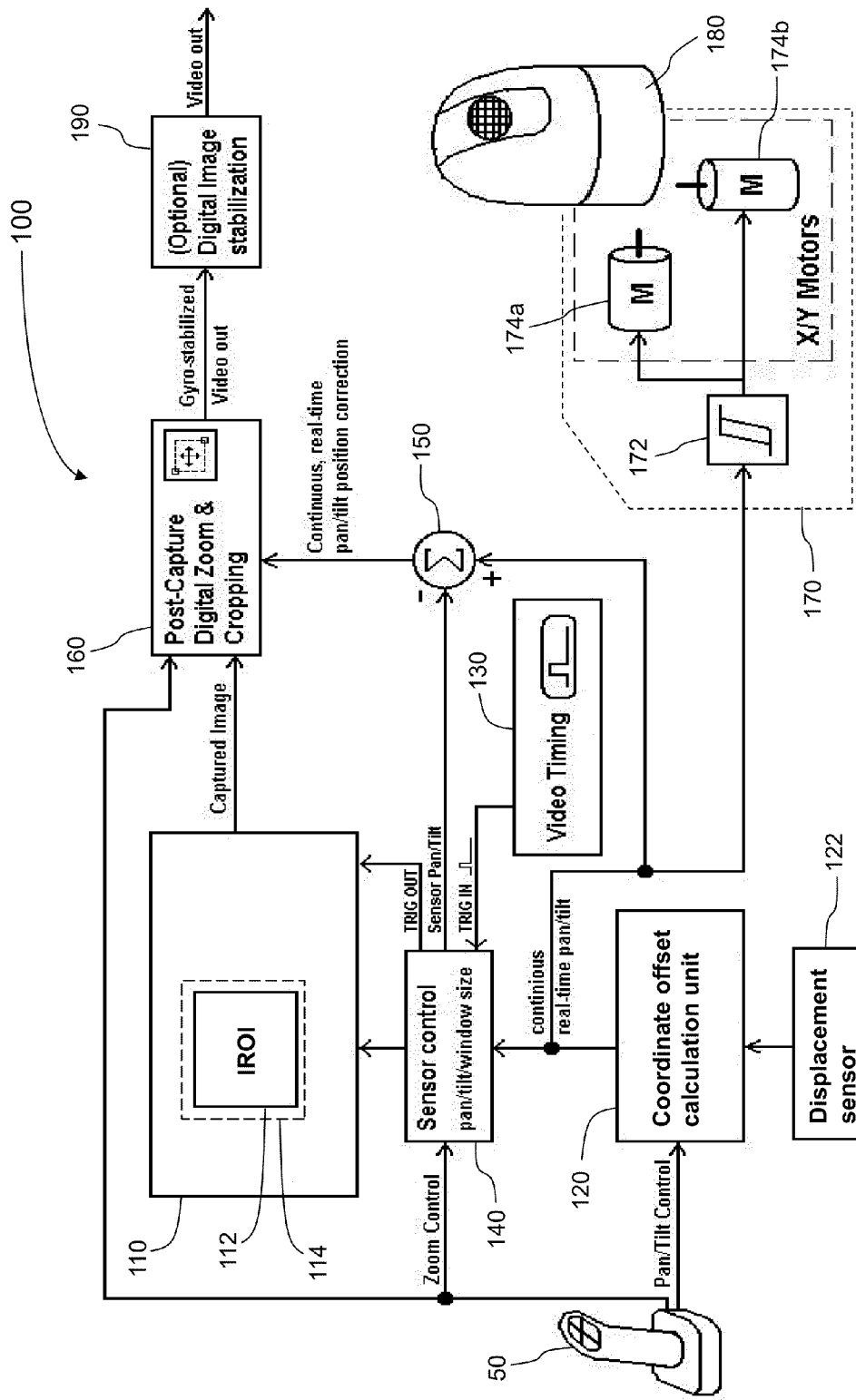
FIG. 1 is a block diagram illustration of an air-born camera system for performing image acquisition and image transmission, according to the preferred embodiments of the present invention.

Before explaining embodiments of the invention in detail, it is to be understood that the invention is not limited in its application to the details of construction and the arrangement of the components set forth in the host description or illustrated in the drawings.

Unless otherwise defined, all technical and scientific terms used herein have the same meaning as commonly understood by one of ordinary skill in the art of the invention belongs. The methods and examples provided herein are illustrative only and not intended to be limiting.

Reference is now made to the drawings. FIG. 1 is a block diagram illustration of an air-born camera system 100 for performing image acquisition and image transmission, according to the preferred embodiments of the present invention. Air-born camera system 100 includes a high resolution digital image sensor (typically, in current state of the art, higher than 1 mega pixels) 110, a coordinate offset calculation unit 120, a displacement sensor 122, a video timing (clock) unit 130, an image sensor configuration control unit 140, a computation unit 150, a post-capturing image processing unit 160, an X/Y motorized compensation unit 170, preferably a gimbaled device 180 (on which image sensor 110 is mounted) and optionally, a digital image stabilization unit 190.

It should be noted that although the present invention is described in terms of a computerized camera system mounted on an air born vehicle, the computerized camera system of the present invention is not limited to be mounted only on air vehicles. Similar computerized camera systems can be mounted on/in land vehicles, waterway vehicles, carried by a living body, for example by hand, or mounted on any other moving and/or vibrating platform. Similar motion and vibration problems exist in land vehicles, waterway vehicles and other platforms. It should be further noted that typically, the smaller the vehicle is the less stable the vehicle is, whereas an air vehicles for carrying camera are typically small.

Typically, camera system 100 is operatively mounted on an air-born vehicle. When in operation, the air-born vehicle maneuvers to stay in a desired path using a manual or remote steering control. Digital image sensor 110 of camera system 100 may encounter two types of motions which need to be compensated for in order to stabilize the acquired image streams. Digital image sensor 110 has Pan and Tilt degrees of freedom. Regardless of the platform maneuvering, the Pan and Tilt motion of digital image sensor 110 is controlled, on board or remotely, by a camera steering controller 50. The camera steering signals sent by camera steering controller 50 carry the data regarding the Pan and Tilt motion of digital image sensor 110. Furthermore, the vehicle typically encounters unstable conditions such as air pockets, and incurs various motions, vibrations and trembling caused by units such as engine, motors etc.

Figure 2:
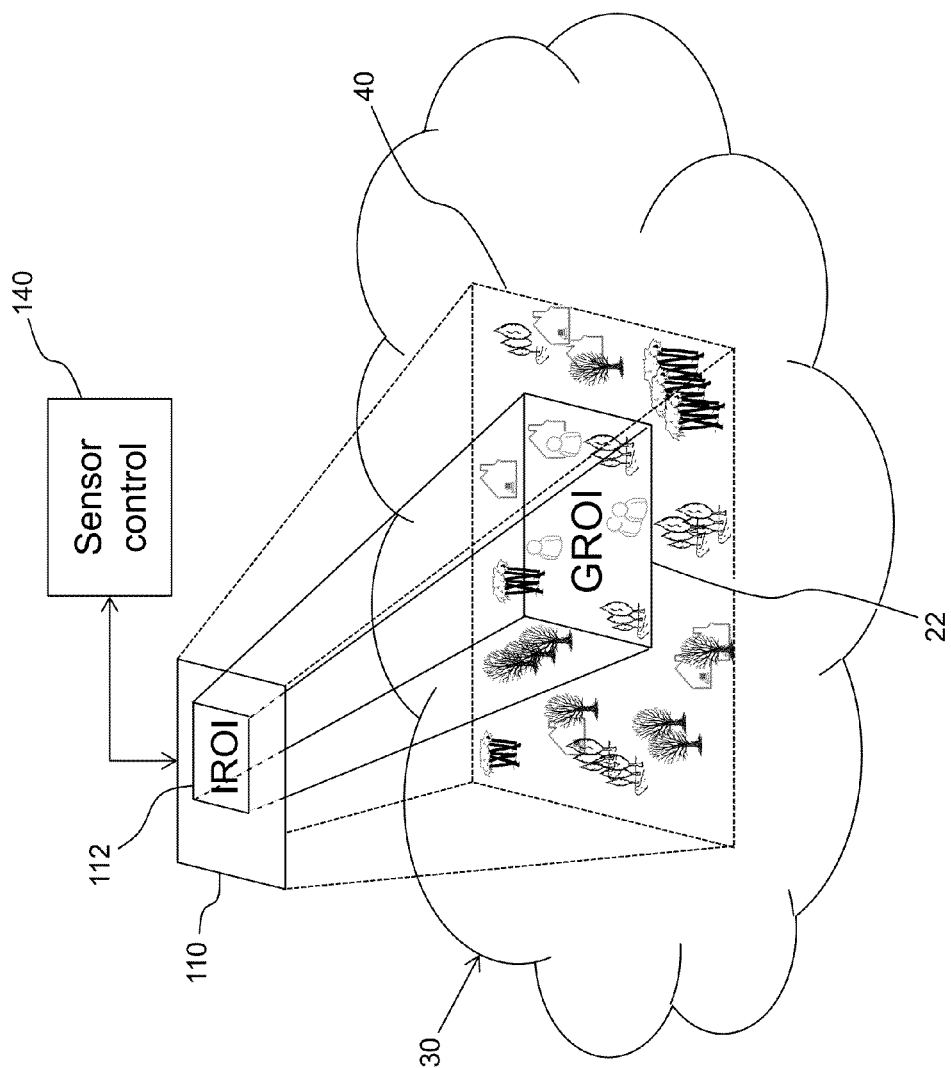
FIG. 2 is a schematic illustration of an example spatial environment, in which the air-born camera system shown in FIG. 1 operates.

Reference is also made to FIG. 2, which is a schematic illustration of an example spatial environment, in which camera system 100 operates. In the example shown in FIG. 2, the array image sensor 110 images a geographical zone 40, being part of a larger geographical region 30. The operator selects a geographical region of interest (GROI) 22 which is imaged onto image region of interest (IROI) 112, being a virtual portion of image sensor 110. Configuration control unit 140 continuously tracks the position of IROI 112 and maintains IROI 112 within the boundaries of active array of image sensor 110. It should be noted that GROI 22 may also be selected automatically, for example by tracking a static or moving object. It should be further noted that in some applications, the region of interest is selected from the environment as viewed by the camera. Therefore, the terms "geographical region of interest" and "environmental region of interest" are used herein interchangeably.

To facilitate a high image frame transfer rate, while maintaining high resolution image sampling by a high resolution image sensor, only the portion of the image frame acquired from IROI 112 is preferably transferred to post-capturing image processing unit 160, for further processing. But, to enable post-capturing image processing unit 160 to perform the post processing task more accurately, a raw IROI 114 is transferred to post-capturing image processing unit 160, wherein raw IROI 114 is larger than IROI 112 by a predefined margin of pixels.

The camera is controlled by a camera steering controller 50, manned or remotely, which typically, enables maneuvering the camera in the Pan and Tilt axes. The control can be done manually by an operator or automatically using an object tracker or GPS location. Steering signals, such as "Pan" and "Tilt" signals, corresponding to the respective movements of the camera, as transmitted by camera steering controller 50, are also provided to coordinate offset calculation unit 120.

More motional information, such as vibrations and motion resulted from air pockets, is provided to coordinate offset calculation unit 120 by a displacement sensor 122. Displacement sensor 122 can be, for example, a gyro sensor, preferably a MEMS gyroscope such as a MEMS rate-gyro. Based on the received motion related signals, coordinate offset calculation unit 120 continuously aggregates the pan-tilt coordinate changes of the vehicle. The calculated offset is then used by image sensor configuration unit 140 to reposition IROI 112 upon image sensor array 110.

Video timing unit 130 generates trigger pulses synchronous with the preselected frame acquisition rate (typically, 25 (PAL) or 30 (NTSC) frames per seconds), wherein the pulses are forwarded to image sensor configuration unit 140. Image sensor configuration unit 140, at the arrival of a trigger pulse and after configuring IROI 112 according to the most recent motion calculations, transfers the configuration data along with a "trigger out" signal to image sensor 110, which in turn acquires a new image frame.

Figure 4:
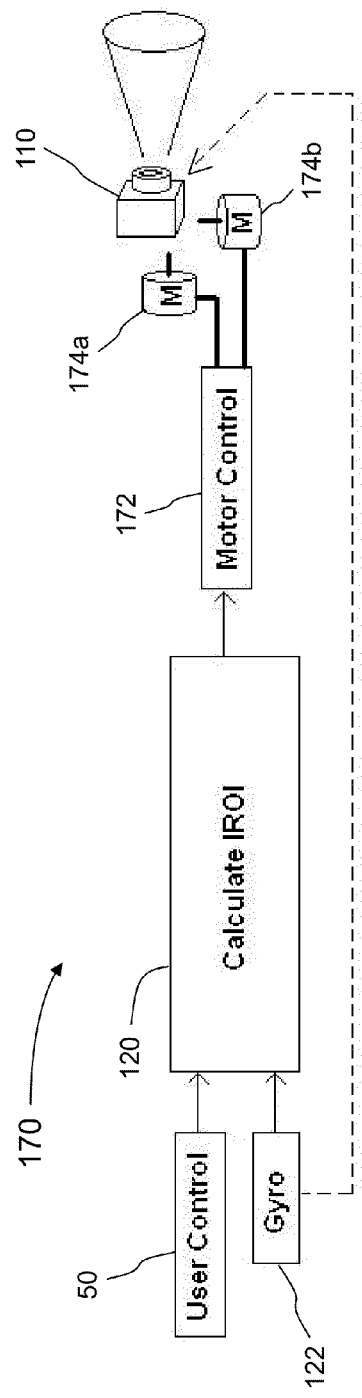
FIG. 4 is a block diagram illustration of the motorized compensation unit, shown in FIG. 1.

Threshold unit 172 of X/Y motorized compensation unit 170 calculates the distance of each frame-edge of raw IROI 114 from the corresponding frame-edge of the image array of image sensor 110. Motorized compensation unit 170 is also illustrated in FIG. 4. If the distance is below a predetermined threshold value, motors 174 operatively move gimbal 180 and thereby image sensor 110 mounted on gimbal 180, such that the center of raw IROI 114 is repositioned nearer to the center of the image array of image sensor 110. The motion of motors 174 is derived from the real time data received from coordinate offset calculation unit 120. In variations of the present invention, motors 174 are continuously activated to keep the center of GROI 22 reflected substantially at the center of image sensor array 110.

Since there is a time interval ("post acquisition time interval") between the calculation of the repositioning of IROI 112 and the actual capturing of the image frame, post processing is applied to the captured image, to correct the distortions in the image caused due to camera motions during the post acquisition time interval. The post processing tasks are performed by post-capture image processing unit 160. Computation unit 150 computes the differences from the instant of issuing of the acquisition command by image sensor configuration unit 140 to image sensor 110 to acquire the next image frame, until the actual acquisition of the next image frame takes place. The differences are caused by various platform motions during the post acquisition time interval, which motions are continuously provided in real time by coordinate offset calculation unit 120, and which motions are aggregated to form an aggregated motion vector.

It should be noted that when using a global-shutter, the time taken as the acquisition time of an image frame, is preferably the middle of the frame exposure time. When using rolling-shutter image sensor, the time taken as the acquisition time of the image frame, is the middle of current line exposure time. Correction is preferably applied to each scanned line in the image frame.

Figure 3:
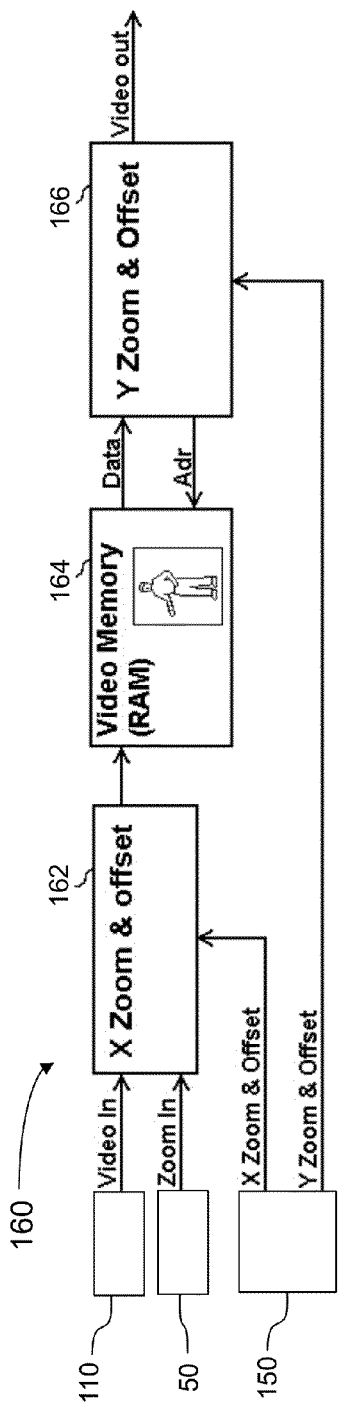
FIG. 3 is a block diagram illustration of the post-capture digital zoom and cropping unit of the air-born camera system, shown in FIG. 1.

The calculated differential information is forwarded from computation unit 150 to post-capture image processing unit 160, as described in the block diagram illustration shown in FIG. 3. X-axis zoom and offset unit 162 receives the captured image stream from image sensor 110 and alters relevant image regions, in sub-pixel accuracy, as a function of the calculated X-axis zoom and offset. Video memory unit 164 receives and stores image frame lines from "x zoom and offset" unit 162. Y-axis zoom and offset unit 166 generates and stores an address signal in memory unit 164 with a selected address offset and line-to-line step as a function of the calculated Y-offset and zoom. Preferably, Y-axis zoom and offset unit 166 has a cache memory to calculate and execute zoom and sub-pixel shift operations. Furthermore, post-capture image processing unit 160 is used to remove image jitter and to correct rolling-shutter distortion, caused by time delay between acquisitions of each scanned line.

Optionally, digital image stabilization unit 190 performs final digital image stabilization and small jitter correction, for example, by computing the correlation between the currently processed frame and the previously transmitted frame of a final IROI.

Preferably, the resulting image frame is then cropped to remove the margins added to raw IROI 114 to yield a final IROI, which is then transmitted to a video receiving unit, typically a remote video receiving unit.

Figure 5:
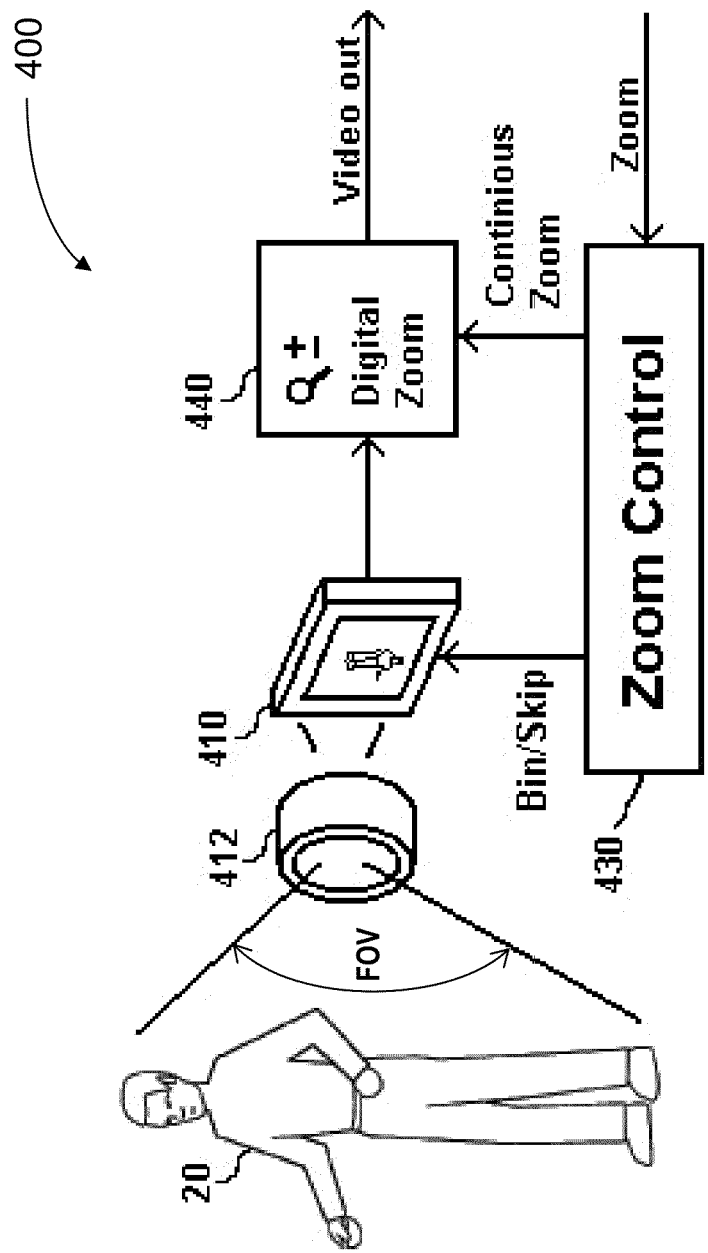
FIG. 5 is a block diagram illustration of a zoom control sub-system for an air-born camera system, according to variations of the present invention.

Various zoom control sub-systems can be used to control the zoom of an air-born camera system. Reference is made to FIG. 5, which is a block diagram illustration of zoom control sub-system 400 for an air-born camera system, according to embodiments of the present invention. Zoom control sub-system 400 includes image sensor 410 having lens module 412 having a fixed focal length lens or zoom lens, zoom control module 430 and digital-zoom module 440. An object 20 is captured by image sensor 410 through lens module 412. Zoom control unit 430 calculates the most optimal values for image sensor 410, binning/skip factors and continuous digital-zoom values that are provided to digital-zoom unit 440. Setting the binning/skip factor and windowing of image sensor 410 allows to keep a suitable frame refresh rate, while digital-zoom unit 440 provides continuous zoom.

A binning function, which function may be provided by the sensor array provider, is a zoom out function that merges 2×2, or 4×4, or 8×8 pixels pixel array, or any other group of pixels, into a single pixel, whereby reducing the image frame dimensions. The binning function may be refined by using algorithms such as "bi-linear" interpolation, "bi-cubic" interpolation and other commonly used digital zoom algorithms. A skip function, which function may also be provided by the sensor array provider, is a zoom out function that allows skipping pixels while reading frame out, whereby reducing the image frame dimensions and decrease the image acquisition time.

Figure 6:
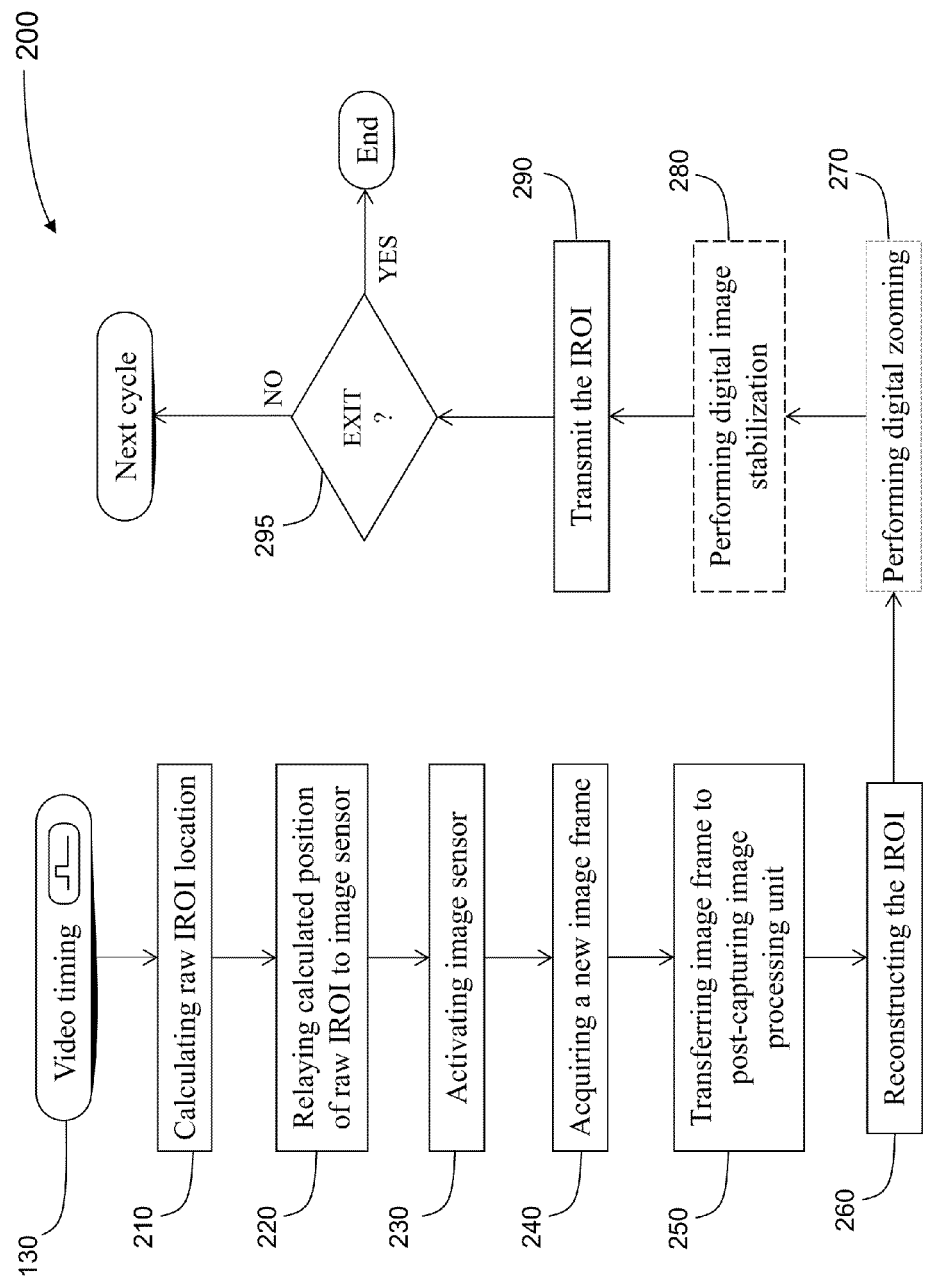
FIG. 6 is a data flow diagram illustration one cycle of an image acquisition process, according to variations of the present invention.

Video timing unit 130 generates trigger pulses synchronous with the preselected frame acquisition rate, wherein the pulses are forwarded to image sensor configuration unit 140. Each such trigger initiates a new cycle of acquiring an image frame. An image acquisition cycle 200, as outlined in FIG. 6, includes the following steps:

Step 210: calculating a new raw IROI 114 location.

The new raw IROI 114 position upon image sensor array 110 is calculated as follows:

new location=previous location+camera steering changes−sensed displacement changes.

Configuration control unit 140 continuously calculates the position of raw IROI 114 to maintain the entire raw IROI 114 within the active array of image sensor 110. Configuration control unit 140 continuously receives signal from coordinate offset calculation unit 120, which continuously calculates the pan-tilt coordinate changes of the camera in space, based on motion related signals provided by camera steering controller 50 and displacement sensor 122, and aggregates the motion related changes to form an aggregated motion vector. The aggregated motion vector is then used by image sensor configuration unit 140 to reposition raw IROI 114 upon image sensor array 110. It should be noted that the size of raw IROI 114 depends also on the zoom, also calculated in the formation of the motion vector.

Step 220: relaying calculated position of raw IROI 114 to image sensor 110.

The newly calculated position of raw IROI 114 upon to image sensor 110 is transmitted to image sensor 110.

Step 230: activating image sensor 110.
  Image sensor configuration unit 140 transmits a "trigger out" signal to image sensor 110, in order to acquire a new image frame.
Step 240: acquiring a new image frame.
  Image sensor 110 acquires a new image frame.
Step 250: transferring the acquired image frame portion containing raw IROI 114 to post-capturing image processing unit 160.
  The portion of the acquired image frame that was loaded to sensor by image sensor configuration unit 140 as being raw IROI 114 is transferred to post-capturing image processing unit 160.
Step 260: reconstructing the IROI 112.
  Post-capturing image processing unit 160 reconstructs IROI 112 from the transmitted raw IROI 114 and signals received from computation unit 150. Computation unit 150 computes the differences from the instant of issuing of the acquisition command by image sensor configuration unit 140 to image sensor 110 to acquire the image frame, until the actual acquisition of the image frame takes place. The differences are caused by various platform motions during the post acquisition time interval, which motions are continuously provided in real time by coordinate offset calculation unit 120, and which motions are aggregated to form an aggregated motion vector. Post-capturing image processing unit 160 reconstructs IROI 112 based on the aggregated motion vector. The image reconstruction process compensates for image distortions in the opposite direction to the respective distortions vector:
    a) X-axis compensation is done by selecting relevant pixels from the middle of the captured line, wherein the selection computed in sub-pixel accuracy.
    b) Y-axis compensation is done by changing line to line distance at sub-pixel resolution by changing the line offset.
    c) Z-axis (yaw) compensation rotates the image in opposite direction to distortion rotational vector.
Step 270: performing digital zooming.
  Optionally, post-capturing image processing unit 160 performs digital zooming, as needed, using binning and/or skipping.
Step 280: performing digital image stabilization.
  Optionally, digital image stabilization unit 190 performs fine digital image stabilization. For example, digital image stabilization unit 190 performs frame-to-frame correlation by computing motional vectors between identified correlated elements in the current image frame and corresponding elements in a previously transmitted frame. Compensate for the computed motion in the opposite direction to yield the final IROI in the form of an image frame.
Step 290: transmit the final IROI.
  Transmit the final IROI to a predetermined to a video receiving unit, typically a remote video receiving unit.
Step 295: determine if finished to acquire image frames.
  if finished to acquire image frames, exit.
  Else, go to step 210.
  The invention being thus described in terms of embodiments and examples, it will be obvious that the same may be varied in many ways. Such variations are not to be regarded as a departure from the spirit and scope of the invention, and all such modifications as would be obvious to one skilled in the art are intended to be included within the scope of the claims.

What is claimed is:

1. In a computerized camera system mounted on a moving platform, the system including a camera having one or more image sensor arrays, wherein said camera acquires consecutively, in real time, a plurality of image frames including images of the environment viewed from within the field of view of said camera, a method for compensating for image distortions in said acquired image frames, said image distortions formed by motion of said camera during and in between image acquisitions, the method comprising the steps of:
  a) providing camera maneuvering signals;
  b) providing one or more sensors for detecting said motion of said camera;
  c) computing the aggregated motion vector of said camera, thereby determining the pre acquisition image distortion caused by said aggregated motion vector of said camera;
  d) compensating for said determined pre acquisition image distortion by a magnitude equal to the magnitude of said aggregated motion vector, in a direction opposite to the direction of said aggregated motion vector; and
  e) acquiring an image frame.

2. The method as in claim 1, wherein said platform is an air born vehicle.

3. The method as in claim 2, wherein said maneuvering commands are selected from the group consisting of pan and tilt commands.

4. The method as in claim 1, wherein said camera maneuvering signals are maneuvering commands as provided by the steering control of said camera.

5. The method as in claim 1, wherein said one or more sensors is a displacement sensor for sensing changes in spatial position.

6. The method as in claim 5, wherein said displacement sensor is an angular rate sensor, a gyroscope sensor, a rate gyroscope sensor or a smart inertial navigation system unit.

7. The method as in claim 1 further comprising the steps of:
  f) providing an environmental region of interest within said environment viewed from within said field of view of said camera; and
  g) determining the array of pixels being a portion of said one or more image sensor arrays acquiring the image of said environmental region of interest and thereby obtaining an image region of interest,
wherein said compensating for said determined pre acquisition image distortion is performed on said image region of interest.

8. The method as in claim 7, wherein the resolution of said acquired image frame is larger than the resolution of said image region of interest and said final image region of interest.

9. The method as in claim 7, wherein said camera system further includes a motorized mechanical gimbal to extend dynamic range by providing said camera with an additional degree of freedom, and wherein said method further includes the step of:
  h) activating said motorized mechanical gimbal to maintain the central pixel of said image region of interest, representing the center of said environmental region of interest, within a distance less than a predefined threshold value from the center of said image sensor array.

10. The method as in claim 9, wherein said motorized mechanical gimbal uses a pulse width modulation, to control motor force and speed.

11. The method as in claim 7, wherein said camera system further includes a motorized mechanical gimbal for providing said camera with an additional degree of freedom, and wherein said method further includes the steps of:
  h) computing the distance of each edge of said image region of interest from the respective edge of said image sensor array; and
  i) activating said motorized mechanical gimbal to maintain each of said edges of said image region of interest at a distance less than a predefined threshold value from said respective edge of said image sensor array.

12. The method as in claim 11, wherein said computing of said distance of each of said edges of said image region of interest from said respective edge of said image sensor array, uses a hysteresis function.

13. The method as in claim 12, wherein the hysteresis values of said hysteresis function are calculated as a function of zoom and motion changes prediction.

14. The method as in claim 7, wherein the resolution of said acquired image frame is increased using digital zooming methods.

15. The method as in claim 7 further comprising the steps of:
  h) determining the post acquisition image distortion caused by said detected motion of said camera from the instant of said issuing of said acquisition command for acquiring said captured image frame until the actual acquisition of said captured image frame; and
  i) compensating for said determined post acquisition image distortion by a magnitude equal to the magnitude of said aggregated motion vector, in a direction opposite to the direction of said aggregated motion vector, wherein said compensating for said determined post acquisition image distortion is applied to said image region of interest, whereby creating a final image region of interest.

16. The method as in claim 15 further comprising the steps of:
  j) padding said image region of interest with a predefined margin, before said determining said post acquisition image distortion; and
  k) cropping said image region of interest to remove said margin, after said compensating for said determined post acquisition image distortion, before forming said final image region of interest.

17. The method as in claim 15 further comprising the steps of:
  j) providing a zooming mechanism;
  k) providing a zoom request including zoom parameters; and
  l) computing said final image region with said parameters of said zoom request.

18. The method as in claim 17, wherein said zooming mechanism is an optical zoom.

19. The method as in claim 17, wherein said zooming mechanism is an electronic zoom.

20. The method as in claim 17, wherein said zooming mechanism is a combination of optical zoom and electronic zoom.

21. The method as in claim 15, wherein said final image region of interest is transmitted to a video receiving unit.

22. The method as in claim 21, wherein said video receiving unit is a remote video receiving unit.

23. The method as in claim 7 or 8, wherein said camera includes a rolling shutter having a rolling shutter image distortion, and wherein said method further includes the steps of:
  a) determining said rolling shutter image distortion; and
  b) compensating for said determined rolling shutter image distortion in an opposite direction to the direction of said rolling shutter image distortion for each line or pixel in said image region of interest.

24. The method as in claim 23, wherein said determining said rolling shutter image distortion and said compensating for said determined rolling shutter image distortion are performed in line, pixel or sub-pixel resolution.

25. The method as in claim 23, wherein said compensating for said determined rolling shutter image distortion is performed in the X-axis by line shifts to the opposite direction of said rolling shutter motion during the image acquisition scan.

26. The method as in claim 23, wherein said compensating for said determined rolling shutter image distortion is performed in the Y-axis by calculating and changing the line to line distances.

27. The method as in claim 23, wherein said image region of interest is the whole of said one or more image sensor arrays.

28. The method as in claim 23, wherein the resolution of said acquired image frame is larger than the resolution of said image region of interest and said final image region of interest.

29. The method as in claim 23, wherein the resolution of said acquired image frame is increased using digital zooming methods.

30. The method as in claim 23 further comprising the steps of:
  c) providing a digital image stabilization unit;
  d) determining residual image distortions; and
  e) compensating for said residual image distortions.

31. The method as in claim 23, wherein said camera system further includes a motorized mechanical gimbal to extend dynamic range by providing said camera with an additional degree of freedom, and wherein said method further includes the step of:
  c) activating said motorized mechanical gimbal to maintain the central pixel of said image region of interest, representing the center of said environmental region of interest, within a distance less than a predefined threshold value from the center of said image sensor array.

32. The method as in claim 23, wherein said camera system further includes a motorized mechanical gimbal for providing said camera with an additional degree of freedom, and wherein said method further includes the steps of:
  c) computing the distance of each edge of said image region of interest from the respective edge of said image sensor array; and
  d) activating said motorized mechanical gimbal to maintain each of said edges of said image region of interest at a distance less than a predefined threshold value from said respective edge of said image sensor array.

33. The method as in claim 15 further comprising the steps of:
  j) providing a digital image stabilization unit;
  k) determining residual image distortions; and
  l) compensating for said residual image distortions.

34. The method as in claim 33, wherein said determining of residual image distortions includes computing the correlation between a previously computed final image region of interest and the currently computed final image region of interest.

35. The method as in claim 15, wherein the resolution of said acquired image frame is larger than the resolution of said image region of interest and said final image region of interest.

36. The method as in claim 15, wherein the resolution of said acquired image frame is increased using digital zooming methods.

37. The method as in claim 15, wherein said camera system further includes a motorized mechanical gimbal to extend dynamic range by providing said camera with an additional degree of freedom, and wherein said method further includes the step of:
   j) activating said motorized mechanical gimbal to maintain the central pixel of said image region of interest, representing the center of said environmental region of interest, within a distance less than a predefined threshold value from the center of said image sensor array.

38. The method as in claim 15, wherein said camera system further includes a motorized mechanical gimbal for providing said camera with an additional degree of freedom, and wherein said method further includes the steps of:
   j) computing the distance of each edge of said image region of interest from the respective edge of said image sensor array; and
   k) activating said motorized mechanical gimbal to maintain each of said edges of said image region of interest at a distance less than a predefined threshold value from said respective edge of said image sensor array.

39. The method as in claim 1, wherein the resolution of said acquired image frame is increased using digital zooming methods.

40. A computerized camera system mounted on a moving platform for compensating for image distortions in acquired image frames, the system including a camera having one or more image sensor arrays, wherein said camera acquires consecutively, in real time, a plurality of image frames including images of environment viewed from within a field of view of said camera, the camera system comprising:
   a) a coordinate offset calculation unit;
   b) a camera steering control;
   c) a displacement sensor;
   d) an image sensor configuration control unit; and
   e) a video timing unit,
wherein said video timing unit determines the frame acquisition rate of said camera and wherein said video timing unit begins a frame acquisition cycle having a pre acquisition portion and a post acquisition portion;
wherein said camera steering control provides tilt and/or pan motional data of said camera;
wherein said displacement sensor senses said camera motion in space;
wherein said coordinate offset calculation unit continuously aggregates said sensed motions of said camera and thereby determining an pre acquisition aggregated motion vector;
wherein said image sensor configuration control unit determines the pre acquisition image distortion caused by said pre acquisition aggregated motion vector; and
wherein said image sensor configuration control unit compensates for said determined pre acquisition image distortion by a magnitude equal to the magnitude of said pre acquisition aggregated motion vector, in a direction opposite to the direction of said pre acquisition aggregated motion vector, whereby creating a pre acquisition compensated image frame.

41. The camera systems as in claim 40 further comprising:
   f) a computation unit; and
   g) a post-capturing image processing unit,
wherein said coordinate offset calculation unit and said image sensor configuration control unit provide said computation unit with timing on motion data;
wherein said computation unit continuously aggregates said sensed motions of said camera from the instant of issuing of a command for acquiring an image frame until the actual acquisition of the image frame and thereby determining a post acquisition aggregated motion vector;
wherein said post-capturing image processing unit determines the post acquisition image distortion caused by said post acquisition aggregated motion vector; and
wherein said post-capturing image processing unit compensates for said determined post acquisition image distortion by a magnitude equal to the magnitude of said post acquisition aggregated motion vector, in a direction opposite to the direction of said post acquisition aggregated motion vector, whereby creating a post acquisition compensated image frame.

42. The camera systems as in claim 41 further comprising a digital image stabilization unit, wherein said digital image stabilization unit performs final digital image stabilization and small jitter correction.

43. The camera system as in as in claim 41 further comprising a motorized gimbaled device, wherein said motorized gimbaled device provides said camera with an additional degree of freedom; and wherein said motorized gimbaled device facilitates maintaining a pre selected environmental region of interest within said field of view of said camera.

44. The camera systems as in claim 40 further comprising a mechanism for adjusting the zoom of said camera.

45. The camera systems as in claim 40 further comprising a motorized gimbaled device, wherein said motorized gimbaled device provides said camera with an additional degree of freedom; and wherein said motorized gimbaled device facilitates maintaining a pre selected environmental region of interest within said field of view of said camera.

46. The camera system of claim 40 further comprising a remote video receiving unit.

* * * * *